Dec. 28, 1965    L. S. SULLIVAN, JR    3,226,141
BALL JOINT SEAT ASSEMBLY
Filed Oct. 22, 1962

INVENTOR.
Leo S. Sullivan, Jr.
BY
*Albert H. Reuther*
His Attorney

United States Patent Office 3,226,141
Patented Dec. 28, 1965

3,226,141
BALL JOINT SEAT ASSEMBLY
Leo S. Sullivan, Jr., Dayton, Ohio, assignor to General Motors Corporation, Detroit, Mich., a corporation of Delaware
Filed Oct. 22, 1962, Ser. No. 232,165
2 Claims. (Cl. 287—87)

This invention relates to a ball joint seat assembly, and more particularly, to an integral ball seat and retaining means in combination therewith.

An object of this invention is to provide a new and improved ball joint seat assembly that provides simultaneously for preloading the ball, self-adjustment for wear compensation as well as minimizing any need for lubrication maintenance.

Another object of this invention is to provide a ball joint seat assembly including a stud carrying a curved head portion to fit in a housing portion with a cylindrical cavity therein to be closed off by cover means and also adapted to receive a combination preloading and wear-compensating low-friction bearing seat portion that includes an annular body of low-friction resilient material having a curved inner periphery as well as an outwardly flared flange end having radial slits located axially therein at predetermined locations and adapted to be fitted within the cylindrical cavity of the housing portion.

Another object of this invention is to provide a method of preloading a ball joint seat retainer assembly to increase bearing capacity thereof and simultaneously providing wear compensation by steps of tapering an outer periphery of one end of a ball seat having a curved inner periphery at an opposite end thereof, radially slitting the ball seat longitudinally along said tapering location, heating the ball seat to a predetermined temperature to increase ductility thereof, snapping the ball axially into place with an integral stud thereof projecting away from said tapering, pressing the ball and seat into a socket-like recess while simultaneously urging radially inwardly the outer tapering periphreal end of the ball seat into the preloading, increased bearing capacity and wear compensating condition, and finally covering the socket-like recess at a location remote from the stud projecting therefrom.

A further object of this invention is to provide a method of preloading a ball joint seat retainer assembly to increase bearing capacity thereof and simultaneously providing wear compensation by steps of tapering an outer flared peripheral end of a ball seat having a curved inner periphery at an opposite end thereof, radially slitting alternate deep and shallow slots into the ball seat longitudinally along said tapering location, heating the ball seat to a predetermined temperature such as in oil at substantially 180° F. to increase ductility thereof, snapping the ball axially into place with an integral stud thereof projecting away from said tapering, pressing the ball and seat into a socket-like recess while simultaneously urging radially inwardly the outer tapering flared peripheral end of the ball seat into the preloading, increased bearing capacity and wear compensating condition, and finally covering the socket-like recess at a location remote from the stud projecting therefrom.

Another object of this invention is to provide a ball joint assembly including a stud carrying a curved head portion chromed to avoid possible corroding thereof in service as well as a combination preloading and wear-compensating low-friction bearing seat portion of "Delrin" acetal resin with "Teflon" fluorine-containing polytetrafluoroethylene fibers mixed therein for minimum lubrication requirements accompanied by resiliency and moldability, the bearing seat portion including an annular body having a curved inner periphery at one end as well as an outwardly flared opposite flange end having radial slits of alternately deep and shallow configuration located axially therein and adapted to be fitted within a cylindrical cavity of a housing portion with an inner diameter less than that of the outwardly flared flange end, the deeper slits extending into the curved inner periphery of the annular body so as to permit proper preloading and wear compensating fit to the curved head portion snapped into complementary fit with the curved inner periphery of the annular body.

Further objects and advantages of the present invention will be apparent from the following description, reference being had to the accompanying drawings, wherein a preferred embodiment of the present invention is clearly shown.

Figure 1:
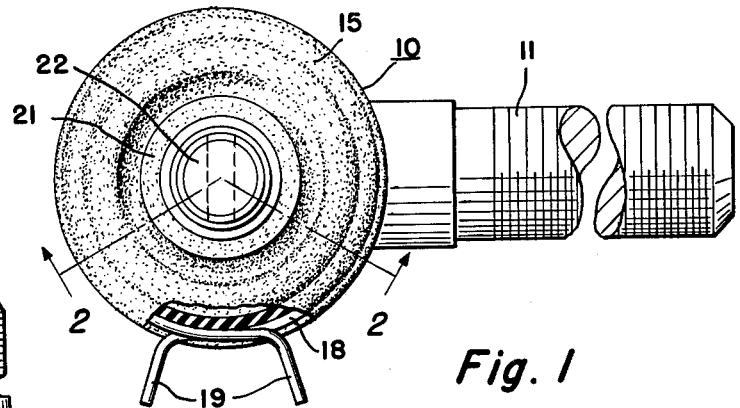
FIGURE 1 is a partially sectioned view of a ball joint seat assembly in accordance with the present invention.
Figure 2:
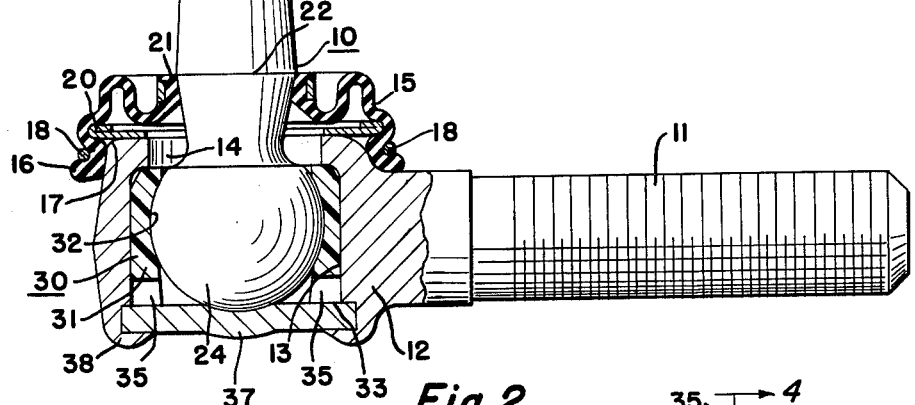
FIGURE 2 is a cross-sectional view taken along line 2—2 in FIGURE 1.

FIGURE 1 is a partially sectioned view of a ball joint seat assembly generally indicated by numeral 10. The assembly 10 as illustrated in both FIGURES 1 and 2 includes a laterally extending threaded stud 11 adapted to be secured as a vehicle linkage tie rod end. The threaded stud 11 is integral with a housing portion 12 as seen in FIGURE 2. The housing portion 12 includes a cylindrical cavity 13 therein that communicates with an axial passage or opening 14 extending therefrom as shown in FIGURE 2.

A bellows-like resilient boot member 15 can have a flanged end 16 thereof fitted peripherally over a shoulder 17 of the housing portion 12 such that a spring metal clamping means 18 with radially outwardly projecting free ends 19 can be in snap-fit tight engagement for anchoring therewith. An expansion spring means 20 can be provided to urge the boot member 15 upwardly as indicated in FIGURE 2 and a radially inwardly projecting seal end 21 of the boot means can engage a conically tapered stud means 22 carried by a ball or curved head portion 24 chromed for corrosion resistance. Additional corrosion resistance can be provided by packing the assembly with a suitable lubricating material retained by the bellows-type dirt-shielding boot sealing member 15. Such lubricant packing can be provided initially during manufacture and no further lubrication is to be required during service and operation of the subject ball joint seat assembly as a result of an improved ball seat per se generally indicated by numeral 30 in views of FIGURES 2, 3 and 4.

The ball seat per se includes an annular body 31 of low-friction resilient material having a curved inner periphery 32 at one end as well as an outward flared opposite end 33. The diameter of the cylindrical cavity 13 of the housing portion 12 is less than outer diameter of the outwardly flared flange end 33. The low-friction resilient material for the ball seat per se 30 can consist of a compounding of "Delrin" acetal resin with "Teflon" fluorine-containing tetrafluoroethylene fibers mixed together for both resiliency and moldability. The fluorine-containing fibers eliminate need for periodic lubrication.

Figure 4:
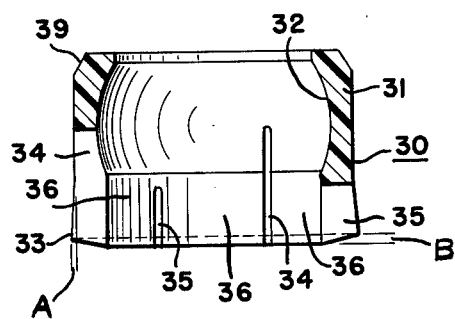
FIGURE 4 is a cross-sectioned elevational view taken along line 4—4 in FIGURE 3.
Figure 3:
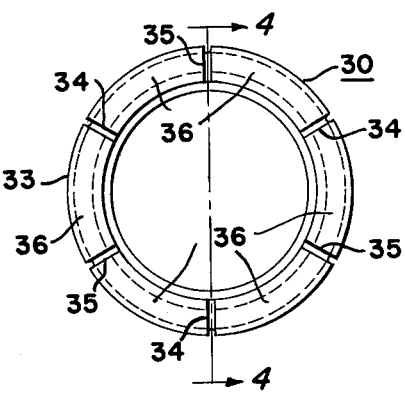
FIGURE 3 is an end view of a ball seat per se having features in accordance with the present invention.

In the ball seat per se there can be provided a plurality of cuts or slits at least some of which extend from one end into the curved periphery 32. In the embodiment shown in views of FIGURES 2, 3 and 4 of the drawings, there are radial slits of alternately deep and shallow configuration located axially in the ball seat and extending longitudinally from the flared flange end 33 thereof. As indicated in FIGURE 4, there can be deep slitting 34 as well as shallow slitting 35 alternately at predetermined locations such that a plurality of segments 36 are formed therebetween and are adapted to be displaced radially inwardly as permitted by the slitting 34–35 for preloading as well as wear-compensating purposes. It is to be noted that alternate deep and shallow slitting can be located at diametrically opposite locations as shown in FIGURE 3 such that the segments 36 therebetween have one end integral with the annular body 31 providing therewith an integral ball seat and retaining means for the curved head portion 24 as indicated in FIGURE 2.

Essential for the present method of preloading the ball joint seat retainer assembly to increase bearing capacity thereof and simultaneously providing wear compensation, the following steps are included during manufacture of the ball joint seat assembly. These steps include tapering the outer flared peripheral end 33 of the ball seat per se having the curved inner periphery 32 at an opposite end thereof. Then there is radial slitting of alternately deep and shallow slots 34–35 into the ball seat per se longitudinally along the tapering location. This tapering on the outside of the ball seat starting at a location to one side of the spherical or curved inner periphery 32 permits preloading of the ball or curved head portion 34 therewith. This tapering combined with the radially and longitudinally extending slots or slits in the seat per se can be effective in causing at least part of the body portion 31 having the spherical or curved inner periphery thereof to be forced radially onto the ball or curved head portion once the ball seat and headed stud as assembled to each other are pressed into the ball joint housing, such as for a tie rod and retainer assembly. Additional preloading is accomplished by the angle along the outwardly flared end to place the segments such as 36 in a bending attitude due to provision of the radial slots or slits 34–35 in the ball seat.

Assembly of the stud and head portion into the seat is accomplished by a step of heating the seat per se in a hot liquid medium such as oil, water and the like at a temperature of substantially 180° F. to increase ductility of the resin material of the ball seat per se followed by snapping the ball or curved head portion 24 into place relative to the curved inner periphery 32. Use of oil for heating the seat per se 30 can be advantageous since this will provide a preliminary lubrication for both inner and outer surfaces thereof to facilitate press fitting of the combined ball and seat assembly into confines of the cylindrical cavity 13 having the diameter thereof less than that of the outwardly flared peripheral end 33. As can be seen in FIGURE 2, the ball seat with the curved head portion 24 therein is assembled to the housing portion 12 such that the stud 22 projects through the opening 14 and is engaged by the sealing end 21 of the boot member. The outwardly flared end 33 is forced radially inwardly such that the segments 36 provide preloading as well as wear compensation and resilient retention of the curved head portion 24 inwardly thereof.

A final step of covering the socket-like recess or cylindrical cavity 13 occurs by attachment of a plug or centrally embossed cover means 37 against the periphery end 33 subject to spinning or peening over a flange 38 radially inwardly and integrally with the housing portion 12 as shown in FIGURE 2.

It is to be noted that use of a circular wave or marcel spring for axial bias per se can be provided centrally as to the embossed cover means 37 through use of any spring axially of the opposite ends of the ball seat per se would not provide the radially inward preloading as permitted by the outwardly flared tapered end having the slots or slits radially and extending longitudinally thereof for elimination of looseness previously encountered after use of a vehicle for a relatively low mileage. Repeated lubrication is avoided for life of a steering linkage due to use of "Delrin" acetal resin with "Teflon" polytetrafluoroethylene fibers chopped and mixed into the composition molded to have the annular body and integral outwardly flared end with slots or slitting therein to provide both preloading as well as self-adjusting features for wear take-up.

As can be seen best in FIGURE 4, the tapered end projects outwardly by an angle of at least 5° as represented by an arc A as well as downwardly by an angle of at least 10° as represented by an arc B and an opposite conical ending 39 having an angle of substantially 30° from the cylindrical outer periphery of the body 31 can be provided. When the ball seat per se 30 is installed in a socket as represented in FIGURE 2, it is apparent that then the tapered end is forced radially inwardly by at least 5° leaving a difference between the arcs A and B due to the inward bending with a resultant 5° downward projection of the lower periphery of the tapered end. This 5° resultant difference assures added preloading of the tapered portion due to engagement of this tapered end by the periphery of the cover 37 as indicated in FIGURE 2 thereby adding a preloading which assures maintenance of the segments such as 36 in a bending attitude for wear take-up simultaneously with the preloading. Preloading the ball or curved head portion 24 by use of the ball seat per se 30 also increases bearing capacity while simultaneously providing a means of wear compensation as well as resilient retention of the composition bearing material between the head portion 24 and housing portion 12.

While the embodiments of the present invention as herein disclosed constitute a preferred form, it is to be understood that other forms might be adopted.

What is claimed is as follows:

1. A ball joint seat assembly, comprising, a stud having a curved substantially segmental spherical head portion, a cover means centrally embossed so as to be complementary to said curved head portion, a housing portion receiving said stud and having a substantially cylindrical cavity therein that terminates in a reduced end opening through which said stud projects away from said cover means, said cover means carried by the housing end portion opposite said reduced opening, and a combination preloading and wear compensating low-friction resilient bearing liner seat portion in said cavity between said reduced end opening and said cover means, said liner including an annular body having a curved substantially segmental spherical inner periphery at one end engaging said curved head as well as an outer periphery at the other end which has an initially radially outwardly flared peripheral end portion prior to assembly, and also a plurality of different sized slits defining segments between said slits which extend longitudinally with said radially outwardly flared peripheral end portion, the flared outer periphery of said end portion prior to completion of joint assembly extending at an angle of substantially 5° outwardly from the outer periphery of said annular body so as to provide an outer diameter on the end portion of the liner greater than the inner diameter of the cylindrical cavity, one end of the liner adjacent the flared periphery initially extending at an angle of substantially 10° downwardly away from the axis of the cylindrical cavity from a reference plane that is perpendicular to the axis of the bearing liner and cylindrical cavity, said liner having a complementary telescopic fit into the cylindrical cavity with said outwardly flared peripheral end portion being forced therein during assembly, such that inward preload occurs due to displaced confinement of the 5° and 10° angular portions of said liner end engaged in assembly by said cylindrical cavity of said body portion and said cover means respectively assembled thereto.

2. The assembly of claim 1, said slits being alternately deep and shallow with at least some thereof extending into the curved inner periphery of the liner body that engages the head portion.

(References on following page)

References Cited by the Examiner

UNITED STATES PATENTS

| | | | |
|---|---|---|---|
| 1,960,956 | 5/1934 | Riedel | 29—149.5 |
| 2,252,351 | 8/1941 | Paulus | 29—149.5 |
| 2,350,398 | 6/1944 | Hufferd. | |
| 2,393,501 | 1/1946 | Brown. | |
| 2,840,881 | 7/1958 | Bateman. | |
| 2,890,041 | 6/1959 | Runton et al. | 308—238 X |
| 2,908,535 | 10/1959 | Runton et al. | 308—238 X |
| 2,921,808 | 1/1960 | David | 287—87 X |
| 2,976,068 | 3/1961 | Jordan | 287—90 |
| 3,004,786 | 10/1961 | Herbenar | 287—90 |
| 3,037,893 | 6/1962 | White. | |
| 3,063,744 | 11/1962 | Flumerflet. | |
| 3,089,198 | 5/1963 | Eirhart | 287—90 X |
| 3,147,537 | 9/1964 | Fadow | 287—90 X |

FOREIGN PATENTS

| | | |
|---|---|---|
| 720,912 | 5/1942 | Germany. |
| 725,724 | 3/1955 | Great Britain. |

OTHER REFERENCES

Ehrenreich: German application 1,118,624, printed November 11, 1961, (KL,63C47).

Delrin acetal resin: published June 1957 by Polychemicals Dept. of E. I. Du Pont de Nemours and Co. (Inc.) Wilmington 98, Del. pages 13–14.

CARL W. TOMLIN, *Primary Examiner.*